United States Patent [19]

Gasparro et al.

[11] 4,021,127

[45] May 3, 1977

[54] JOINTING ELEMENT FOR A COMPOUNDABLE UNIT STRUCTURE, AND A STRUCTURE USING SAID JOINTING ELEMENT

[76] Inventors: Luigi Gasparro, Via Coronelli, 6; Luciano Brunetti, Via Tito Vignoli, 27, both of Milan, Italy

[22] Filed: Feb. 10, 1976

[21] Appl. No.: 656,930

[52] U.S. Cl. .................................. 403/171; 52/475
[51] Int. Cl.² ....................................... F16B 13/00
[58] Field of Search ................... 46/31, 28, 29, 23; 403/295, 171, 176; 52/753 D, 753 C, 753 J, 758 D, 285

[56] References Cited

UNITED STATES PATENTS

| 3,545,123 | 12/1970 | Muller | 46/29 |
| 3,638,803 | 2/1972 | MacMillan | 52/758 H |
| 3,685,465 | 8/1972 | Haumer | 403/295 |
| 3,851,980 | 12/1974 | Worth | 52/758 H |
| 3,883,257 | 5/1975 | Delafield | 403/295 |

FOREIGN PATENTS OR APPLICATIONS 1,090,694  10/1954  France .............................. 403/171

*Primary Examiner*—Andrew V. Kundrat

[57] ABSTRACT

Jointing element for a compoundable unit structure, comprising a plurality of pegs extending along axes which intersect perpendicularly at one point, the pegs being joined together in proximity to the point of intersection of the axes and having their ends dimensioned such that they may be inserted into support tubes; and a plurality of seats in the intersection and joining region of the pegs arranged to accommodate the corners of panels disposed substantially coplanar to the planes defined by the axes, the seats being dimensioned such that the edges of the panels come into direct contact with the support tubes.

1 Claim, 7 Drawing Figures

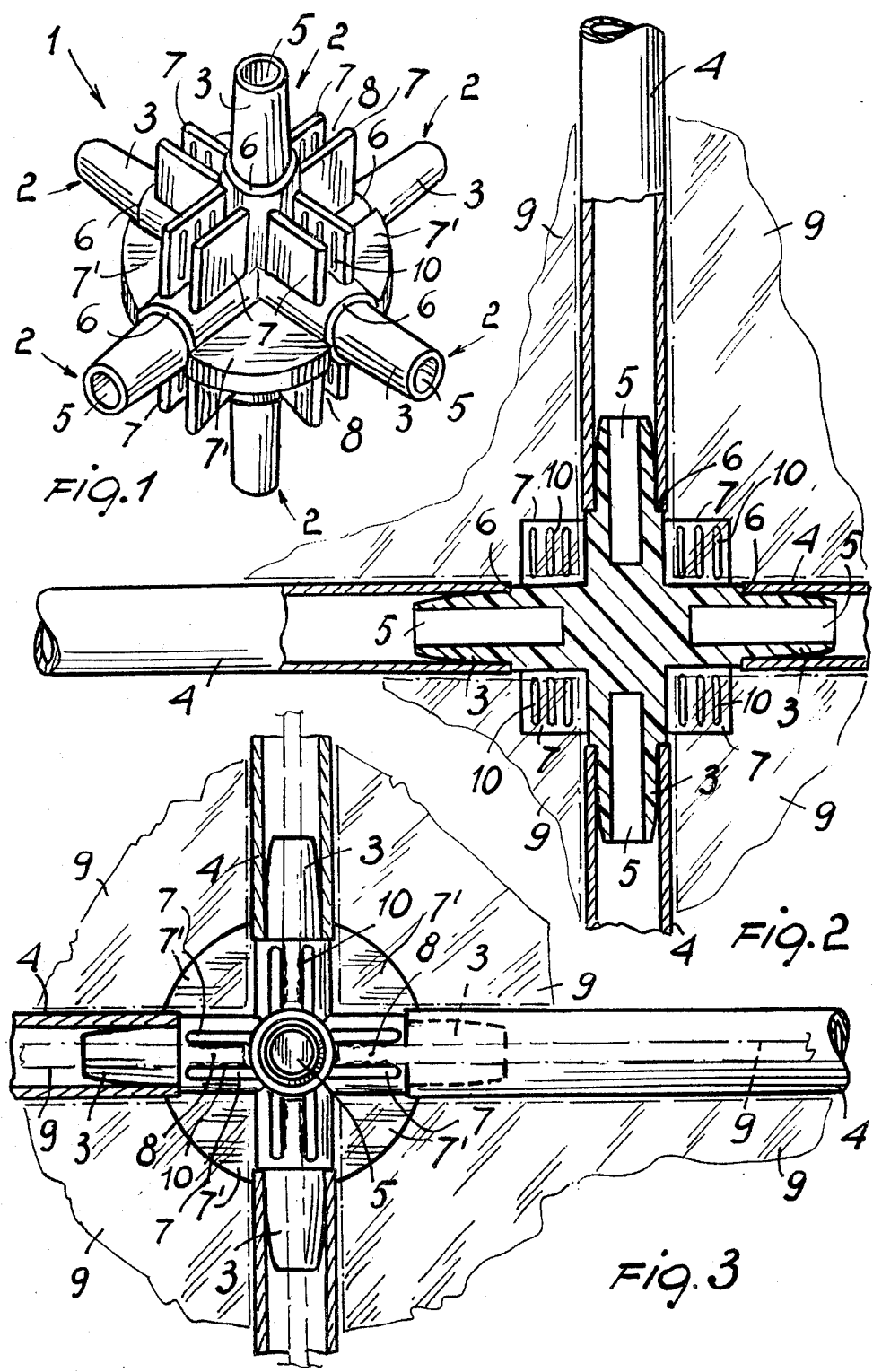

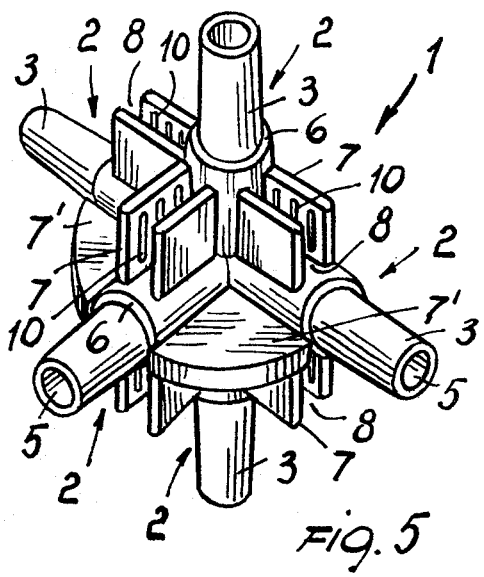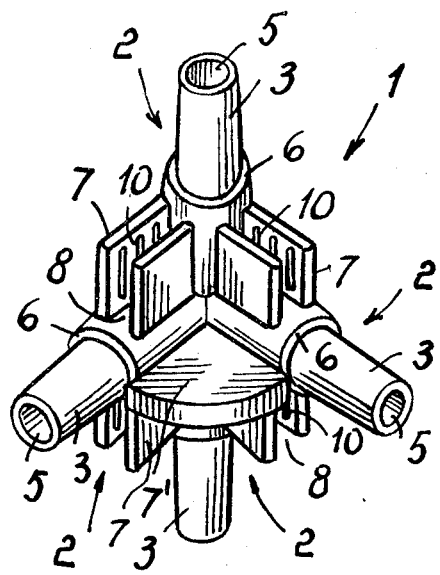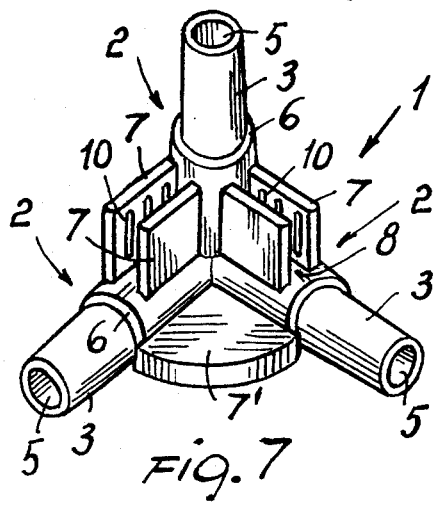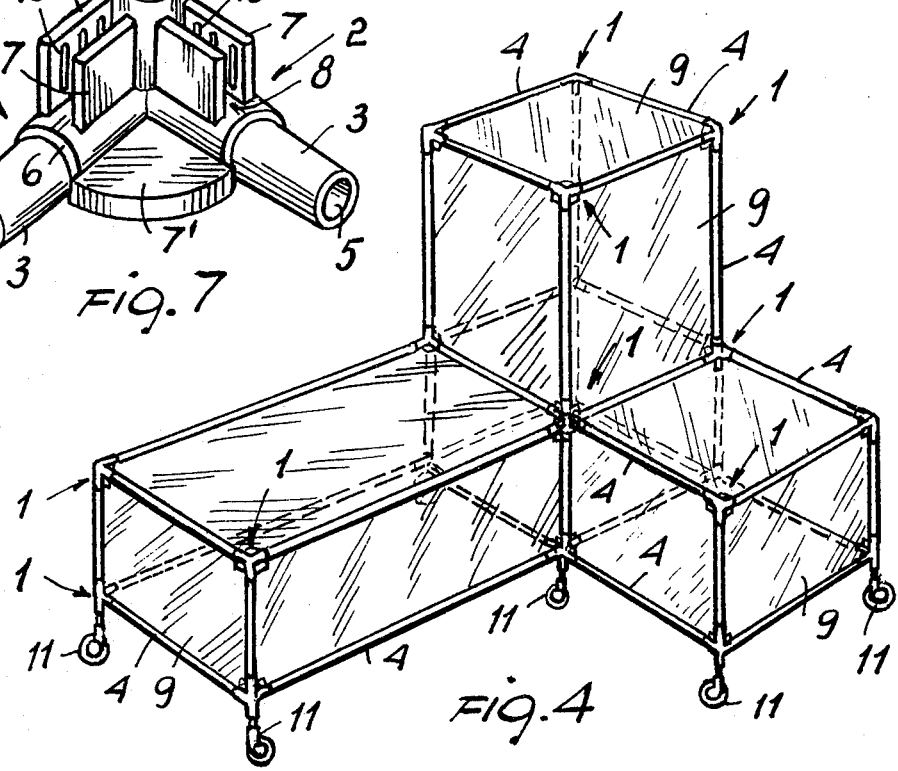

JOINTING ELEMENT FOR A COMPOUNDABLE UNIT STRUCTURE, AND A STRUCTURE USING SAID JOINTING ELEMENT

BACKGROUND OF THE INVENTION

This invention relates to a jointing element for a compoundable unit structure, in particular a show window, and the compoundable unit structure using said jointing element.

The compoundable unit structures, and in particular show windows, which have been constructed up to the present time are notably formed substantially from an assembly of panels of glass panes engaged at their edges by jointing elements, or are formed from panels or glass panes and a lattice of tubes or the like which surrounds the panels or glass panes. The compoundable unit structures formed from panels or tubes are evidently much stronger and more stable than single panes of glass, and allow large dimension show windows and displays to be formed which are able to support considerable forces. These compoundable unit structures considered by the present invention comprise, in known manner, jointing elements which connect and fix the tubes together, while the panels or glass panes are held by clips or bent plates or the like, constructed independently, and shaped to engage a tube at one end and a panel at the other end. Where the panels are disposed in a horizontal position, a bridge-shaped bar for example is disposed with its opposing ends resting on and engaging with two mutually perpendicular tubes, while its intermediate part supports one corner of a panel.

Even though these structures at first sight appear simple and easy to construct, they present certain particularly important disadvantages. In this respect, the fact of having to use a number of different elements in assembling a show window or the like, such as tube jointing elements, clips for the vertical panels and bridges or the like for the horizontal panels, implies both considerable inconvenience in the transporting and procurement of the various elements, and high cost deriving from the sum of the costs of all said elements. Moreover, the plates, clips, bridges and the like, constructed of sheet metal or plastics, are easily deformed, and it is therefore possible for several parts of the structure, once assembled, to be unsteady or badly disposed. Moreover, as the clips and the like may be freely positioned along the tubes of the show window, the panel connections may turn out to be irrational and unbalanced, with very concentrated forces on some clips and a corresponding substantial fragility of the structure. Finally, it cannot be ignored that the clips, plates, bridges and the like necessarily at least partly surround the tubes in order to engage with them, so interrupting the line of the tube and producing a particularly unpleasant aesthetic effect, bearing in mind that the appearance of a show window is a very important characteristic of it.

SUMMARY OF THE INVENTION

The need has been felt to remedy these disadvantages by solving the technical problem of forming a linear compoundable unit structure or simple show window, constructed with a minimum number of elements, but which is strong and entirely reliable.

One object of the present invention is to provide a jointing element able to solve said technical problem and give rise to a particularly simple and rational compoundable unit structure.

A further object of the present invention is to provide a jointing element by which the panels and tubes of a show window or the like are stably and precisely without in practice allowing any possibility of error in assembly, and in such a manner as not to yield with time at the jointing areas.

A further object is to provide a simple, economical and quickly assembled jointing element, which is easy to produce by the industry concerned.

These and further objects which will be more evident hereinafter, are attained by the jointing element for a compoundable unit structure according to the invention, comprising a plurality of pegs extending along axes which intersect perpendicularly at one point, the pegs being joined together in proximity to the point of intersection of said axes and having their ends dimensioned such that they may be inserted into support tubes; and a plurality of seats in the intersection and joining region of the pegs arranged to accommodate the corners of panels disposed substantially coplanar to the planes defined by said axes, the seats being dimensioned such that the edges of the panels come into direct contact with said support tubes.

BRIEF DESCRIPTION OF THE DRAWINGS

Further characteristics and advantages will be more evident from the description of a preferred embodiment of the invention, illustrated by way of example in the accompanying drawings in which:

FIG. 1 is a perspective overall view of the jointing element according to the invention;

FIG. 2 is a vertical section through the joint of FIG. 1, showing the connections with the tubes and panels of the compoundable unit structure;

FIG. 3 is a plan view of FIG. 1 in which the jointing element is shown assembled;

FIG. 4 is a show window constructed with the jointing element according to the invention; and FIGS. 5, 6 and 7 are different embodiments of the jointing element according to the invention.

DESCRIPTION OF PREFERRED EMBODIMENTS

In the stated figures, the jointing element according to the invention is indicated overall by the reference numeral 1. FIG. 1 shows in particular a six-way jointing element 1, particularly suitable for arranging at the centre of a compoundable unit structure. The jointing element 1, referred to hereinafter for brevity as the joint 1, comprises six pegs 2 disposed with an angle of 90° between then and extending along axes of symmetry which intersect in the centre of the joint 1, to define three mutually perpendicular planes. In the joint 1 illustrated, the pegs 2 have a terminal portion 3 for insertion into support tubes 4 better seen in FIGS. 2 and 3. According to the invention, the terminal portions 3 of the pegs 2 have cross-sections which increase towards the centre of the joint 1, to enable to support 4 to be forcibly mounted on the pegs 2. In the accompanying figures, the terminal portions 3 of the pegs 2 have circular cross-sections, as cylindrical support tubes are provided. However it is evident that the shape of these cross-sections may be chosen at will in accordance with the support tubes used. The pegs 2 comprise inner cavities 5 for weight reducing purposes, and are provided externally with stops 6 in the form of annular projections which substantially limit the length of the portion of peg 2 which may be inserted into a support tube 4. Beyond the stops 6 towards the centre of the joint 1, the pegs 2 comprise enlargements in the form of walls 7 which project from the most interior parts of the pegs 2 to define seats 8 for accommodating the corners of panels or glass panes 9 disposed substantially coplanar to the planes defined by the axes of symmetry of the pegs 2. It will be noted that the walls 7 are substantially flat and disposed in pairs for positioning the vertical panels, the most interior portion of each peg 2 comprising two projecting walls 7 which are mutually parallel and extend vertically. Advantageously, the facing sides of the vertical walls 7 comprise ribs 10 which restrict the gap in the seats 8 and are made deformable to allow the corners of the panels 9 to be inserted into them by forcing. The bottom of the seats 8, is arranged in a recessed position with respect to the outer periphery of the tubes 4 as far as is necessary for the panels 9 not to rest on the pegs 2 but instead to make contact with the support tubes 4. In this respect, the lower edges of the vertical panels rest on the support tubes 4. In the joints 1 illustrated, the horizontal walls 7 for supporting the corners of the horizontal panels 9 are not disposed in pairs, but instead, for reasons of simplicity and to allow more rapid positioning of the horizontal panels 9, a single support wall is provided, the upper face of which supports the lower face of the corner of the panel 9 which engages with it.

It is evidently possible to construct the joint 1 in a reduced form if less than six tubes are to be joined, as for example at the edges of show windows.

FIGS. 5, 6 and 7 show five-way, four-way and three-way joints 1 respectively, which allow a show window, for example of the type shown in FIG. 4, to be constructed free from unused projections. In the show window of FIG. 4, the lower pegs 2 disposed at the base of the show window are connected to wheels 11 to enable the show window to be easily moved. If necessary, two-way, three-way or four-way joints 1 can evidently be constructed in which the axes of symmetry of the pegs 2 are all disposed in a single plane.

The operation of the device according to the invention is evident from the description. The joints 1 simultaneously engage both the support tubes 4, which form the framework of the compoundable unit structure, and the panels 9 which define the surface of the compoundable unit structure. The panels 9 rest directly on the support tubes 4 because of the shape of the seats 8 into which their corners are fixed, and there is therefore substantially no gap between the support tubes and panels. The support tubes 4 are mounted on the pegs 2 and the corners of the vertical panels 9 are inserted into the vertical seats 8 by forcing, to give the compoundable unit structure maximum stability and ease of assembly. The horizontal panels 9 of the present embodiment are simply supported at their corners on walls 7' of the joints 1, but this does not compromise their stability in any way, as they are stabilized by their own weight and the weight of the objects which they support.

The invention attains the proposed objects. In this respect, the number of elements necessary for forming a compoundable unit structure, in particular a show window, is considerably reduced, so making the structure much simpler and easy to assemble. As the joints may be moulded and manufactured by mass production, they are economical, and moreover as they engage both with the support tubes of the show window and with its panels, they guarantee the show window a rigidity and stability which are satisfactory and lasting. The panels are retained and locked at their corners and therefore localized stresses due to irrational engagement of the panels are avoided. The show windows constructed with the joints or jointing elements according to the invention are also satisfactory from the appearance aspect, as the line of the tubes is not interrupted and the panels adhere strictly to them without producing any gaps through which dust might easily penetrate.

The invention so conceived is susceptible to numerous modifications, all of which fall within the scope of the inventive idea. Thus for example, the shape of the pegs 2 and the central region of the joint 1 in which the seats for inserting the corners of the panels or glass panes are provided, may be chosen at will. Furthermore, all details may be replaced by technically equivalent elements.

In practice the materials used and the dimensions may be chosen according to requirements.

We claim:

1. Jointing element for a compoundable unit structure, comprising a plurality of pegs extending along axes which intersect perpendicularly at one point, the pegs being joined together in proximity to the point of intersection of said axes and having their ends dimensioned such that they may be inserted into support tubes; and a plurality of seats in the intersection and joining region of the pegs arranged to accomodate the corners of panels disposed substantially coplanar to the planes defined by said axes, the seats being dimensioned such that the edges of the panels come into direct contact with said support tubes, wherein the seats are defined by enlargements projecting from portions of the pegs which are closest to the joining region but which are not involved in the mounting of said support tubes, wherein said enlargements consist of walls which extend substantially flatly, parallel to the faces of said panels, wherein pairs of said walls disposed mutually parallel are provided for positioning a vertical panel, in such a manner that they clamp one corner of said panel from opposite sides, while a single substantially horizontal wall is provided for positioning a horizontal panel, and on which said horizontal panel rests at one of its corners, and wherein each of said pairs of walls arranged to clamp the corner of a vertical panel are provided with deformable ribs to create a seat into which a panel corner is inserted by forcing.

* * * * *